Oct. 2, 1956  W. B. BALL  2,765,104
MEASURING DEVICE
Filed Nov. 14, 1952  6 Sheets-Sheet 1

INVENTOR.
WILLIAM B. BALL
BY James E Cooney
ATTORNEY

Oct. 2, 1956     W. B. BALL     2,765,104

MEASURING DEVICE

Filed Nov. 14, 1952     6 Sheets-Sheet 3

INVENTOR.
WILLIAM B. BALL
BY James E. Cooney
ATTORNEY

Oct. 2, 1956 W. B. BALL 2,765,104
MEASURING DEVICE
Filed Nov. 14, 1952 6 Sheets-Sheet 4

INVENTOR.
WILLIAM B. BALL
BY
James E. Cooney
ATTORNEY

Oct. 2, 1956 W. B. BALL 2,765,104
MEASURING DEVICE
Filed Nov. 14, 1952 6 Sheets-Sheet 5

INVENTOR.
WILLIAM B. BALL
BY James E. Toomey
ATTORNEY

Oct. 2, 1956

W. B. BALL
MEASURING DEVICE 2,765,104

Filed Nov. 14, 1952

INVENTOR.
WILLIAM B. BALL
BY James E Toomey
ATTORNEY

United States Patent Office 2,765,104
Patented Oct. 2, 1956

2,765,104
MEASURING DEVICE

William B. Ball, Oakland, Calif., assignor to Henry J. Kaiser Company, Oakland, Calif., a corporation of Nevada Application November 14, 1952, Serial No. 320,584

9 Claims. (Cl. 222—20)

This invention relates to an apparatus for controlling the flow of fluids through conduits. More particularly, it relates to an apparatus for controlling the addition of specific predetermined amounts of fluid material to a mixing container or the like at predetermined intervals of time, wherein a novel dispensing control mechanism is employed for regulating the amount of fluid material added, together with novel means for actuating the said device.

In addition, the instant apparatus is particularly useful for adding at different time intervals predetermined amounts of pitch material to a container, where the pitch material is commingled or mixed with dry coke and coal aggregates to form a wet paste material, which in turn is used to form continuous anodes of the Soderberg type for aluminum reduction cells.

In the making of this paste, the general practice is for the largest proportion of the total amount of pitch to be added first to dry carbonaceous material in order to effect a more homogeneous final mixture. After the first amount is well mixed in the remainder or smaller portion of the pitch is then added, thereby completing one cycle.

Although various valve means and a control apparatus therefor, including a fluid meter, have been devised and used in the past for controlling the flow or addition of pitch material from a conduit to the batch or mixing container at the proper times, these prior devices generally employ direct and complicated mechanical connections between the control apparatus, including the fluid meter and the valve means. This in turn necessitates location of the overall control apparatus, including the fluid meter, in the immediate vicinity of the valve means, which in turn is generally for all practical purposes located in close proximity to the batch or mixing container.

In this event considerable difficulty is experienced in placing the control apparatus close to the mixing container because the space surrounding the container is generally overcrowded with valves, piping, etc., thereby making installation and access thereto extremely difficult. Accordingly, it is also very difficult to take indicator readings on the control apparatus or make adjustments in such a location. Furthermore, the conventional control devices ordinarily do not provide for the automatic addition of succeeding portions of fluid of differing predetermined amounts without further manual operation.

While the use of what may be termed a remote indicating and control device, which in turn is initially actuated by a fluid meter, has been attempted in the past to obviate such problems, such prior art devices commonly have employed Selsyn motors for operating certain of the elements in the control system. The use of Selsyn motors for this purpose has a disadvantage in that they are relatively complicated and expensive and require the employment of highly trained personnel to keep them in proper operation.

The general control apparatus of the present invention overcomes the above disadvantages in that by including a solenoid operated valve for controlling the flow of pitch material from the fluid supply conduit to the mixing container, and flexible shaft means for connecting a fluid meter in the fluid conduit with the indicating and dispensing control elements of the device or apparatus, it is possible to place the control apparatus, including the dispensing control mechanism indicator means therefor, in any location which is convenient for operation and thereby avoids the necessity of placing the control apparatus close to the mixing container or in a location where space is at a premium.

By the use of a plurality of suitably actuated switch elements on the dispensing control mechanism of the control apparatus for effecting the operation of the valve in the fluid supply conduit, each of which may be independently set for a predetermined quantity of fluid material, the automatic additions of succeeding portions of fluid material of differing predetermined amounts can also be permitted. Furthermore, the control apparatus of the present invention by employing flexible shaft means for remote operation of the dispensing control mechanism and the indicator means forming a part thereof provides an inexpensive and simple means for controlling the flow of pitch material at the proper times to a mixing container or the like, which may be serviced and maintained by relatively unskilled personnel.

Accordingly, one object of this invention is to provide novel control apparatus, including a novel dispensing control mechanism, for so controlling a valve in a fluid supply conduit as to cause the valve to remain open at predetermined intervals and to close when a predetermined amount of fluid material has passed through said conduit, wherein the dispensing control mechanism may be conveniently located in a position remote from the control valve.

A further object of the present invention is to provide novel control apparatus, including a novel dispensing control mechanism, which is adapted to regulate the flow of successive amounts of fluid material to a batch or mixing container at predetermined intervals of time.

A further object of this invention is to provide a novel control apparatus of the class described, wherein the remote operation of a valve means thereby is accomplished by a relatively inexpensive control device, including a novel dispensing control mechanism, which can be serviced by relatively unskilled personnel.

A further object of this invention is to provide a novel control apparatus, including a dispensing control mechanism, for use in supplying a measured amount of fluid material in a batch process at predetermined time intervals, wherein succeeding portions of fluid material of different predetermined amounts can be automatically fed to a mixing container.

A further object of this invention is to provide a novel control apparatus, including a dispensing control mechanism, for use in supplying pitch material to dry coke and coal aggregates used in forming the continuous anodes of the Soderberg type for aluminum reduction cells, wherein the major amount of pitch material is automatically added at a predetermined time, followed by a predetermined interval of time wherein no material is added in order to accomplish thorough mixing of the major portion and a dry carbonaceous material in the mixing container, after which interval of time another minor amount of pitch material is then automatically added to the batch of previously mixed pitch and carbonaceous material.

Other objects and advantages of the invention will become more apparent from a review of the following detailed description when taken in conjunction with the accompanying drawings wherein.

Figure 6:
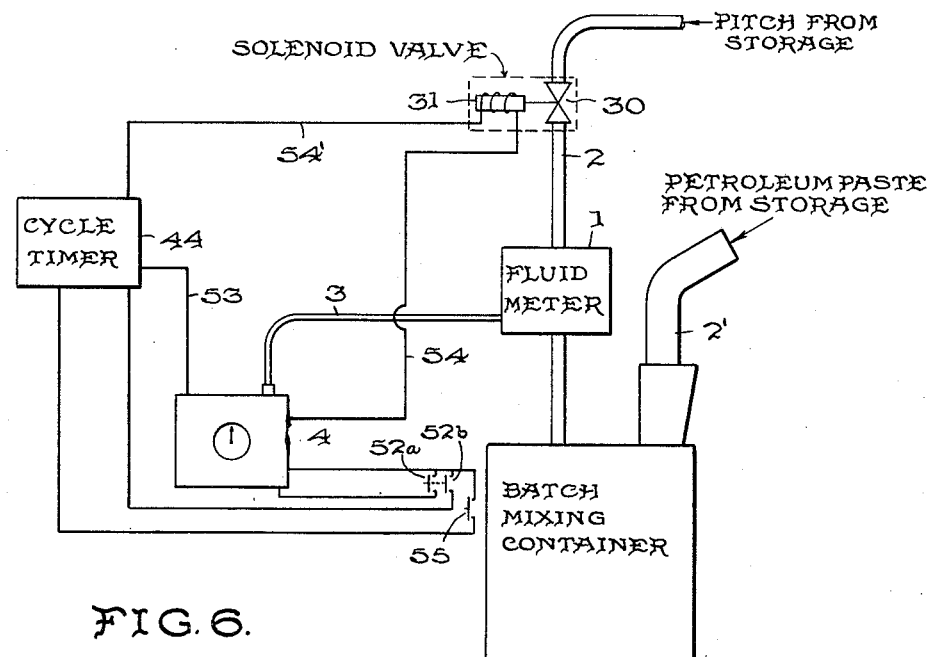
Figure 6 is a schematic diagram of the feeding device for directing the fluid material, such as pitch, to a mixing container and the control apparatus therefor, including the dispensing control mechanism.

Referring to the drawings in which the same reference numerals have been applied to like parts in the various views, and particularly Figure 6, it will be observed that the means for generally controlling the feeding of pitch material to a batch or mixing container is comprised of a fluid control meter 1, which may be of the impeller type connected to the fluid supply conduit 2 for the pitch material. A solenoid operated control valve 30 is also connected to conduit 2. The control apparatus also includes a suitable clock type timer 44 for operating valve 30 at predetermined time intervals; and a remote dispensing control mechanism 4, connected to the fluid meter 1 by a flexible shaft 3, said dispensing control mechanism also being electrically connected to the timer 44 and valve 30 by the leads 53 and 54, with the lead 54' also connecting the timer 44 to the solenoid operated valve 30 to complete the circuit. It is to be understood that suitable means are also provided for supplying the dry coke and coal aggregates to the mixing container, such as the supply conduit 2'.

All of the aforesaid devices, with the exception of the remote dispensing control mechanism 4, may be of conventional design and consequently need not be described in detail.

Figure 1:
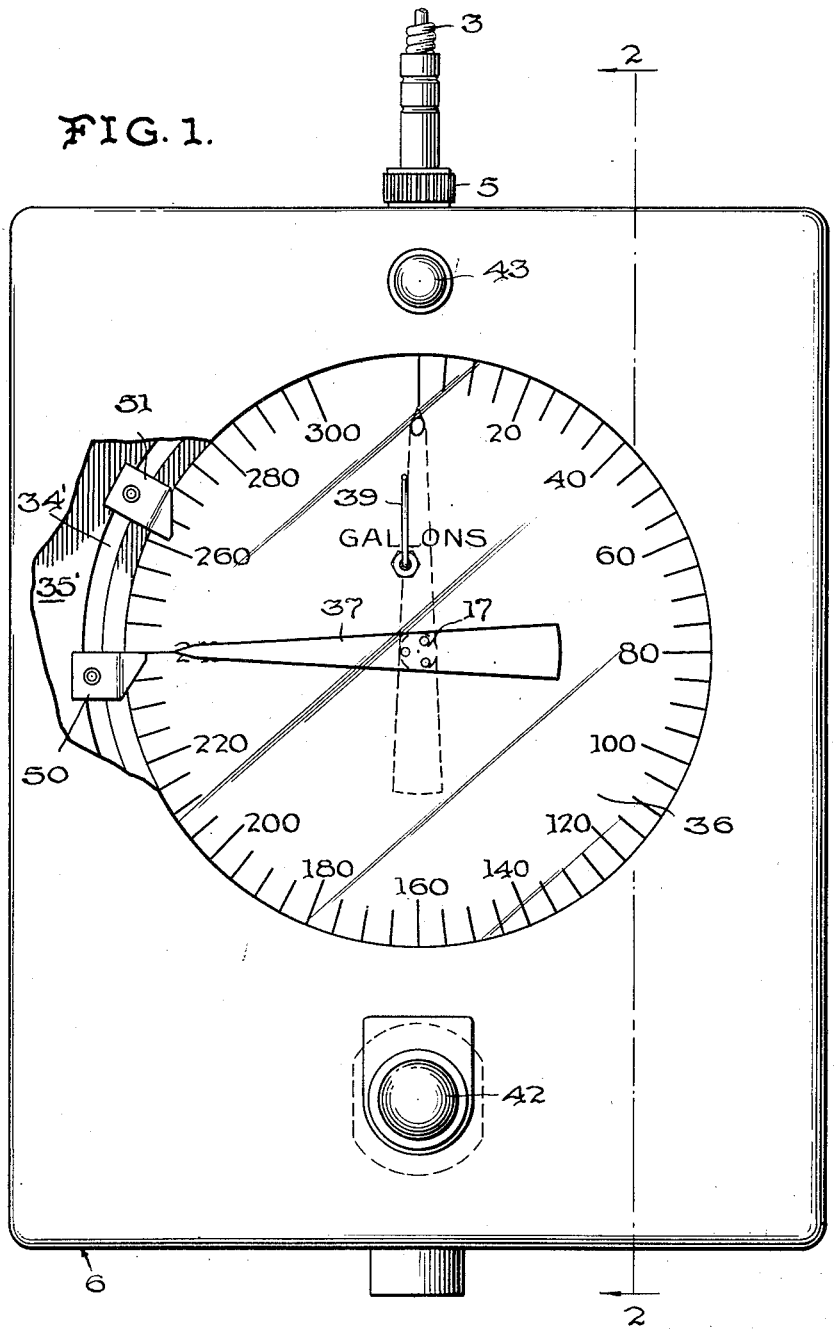
Figure 1 is a front elevational view of the proportioning device or element of the control apparatus of the instant invention, together with the indicating means thereon.
Figure 2:
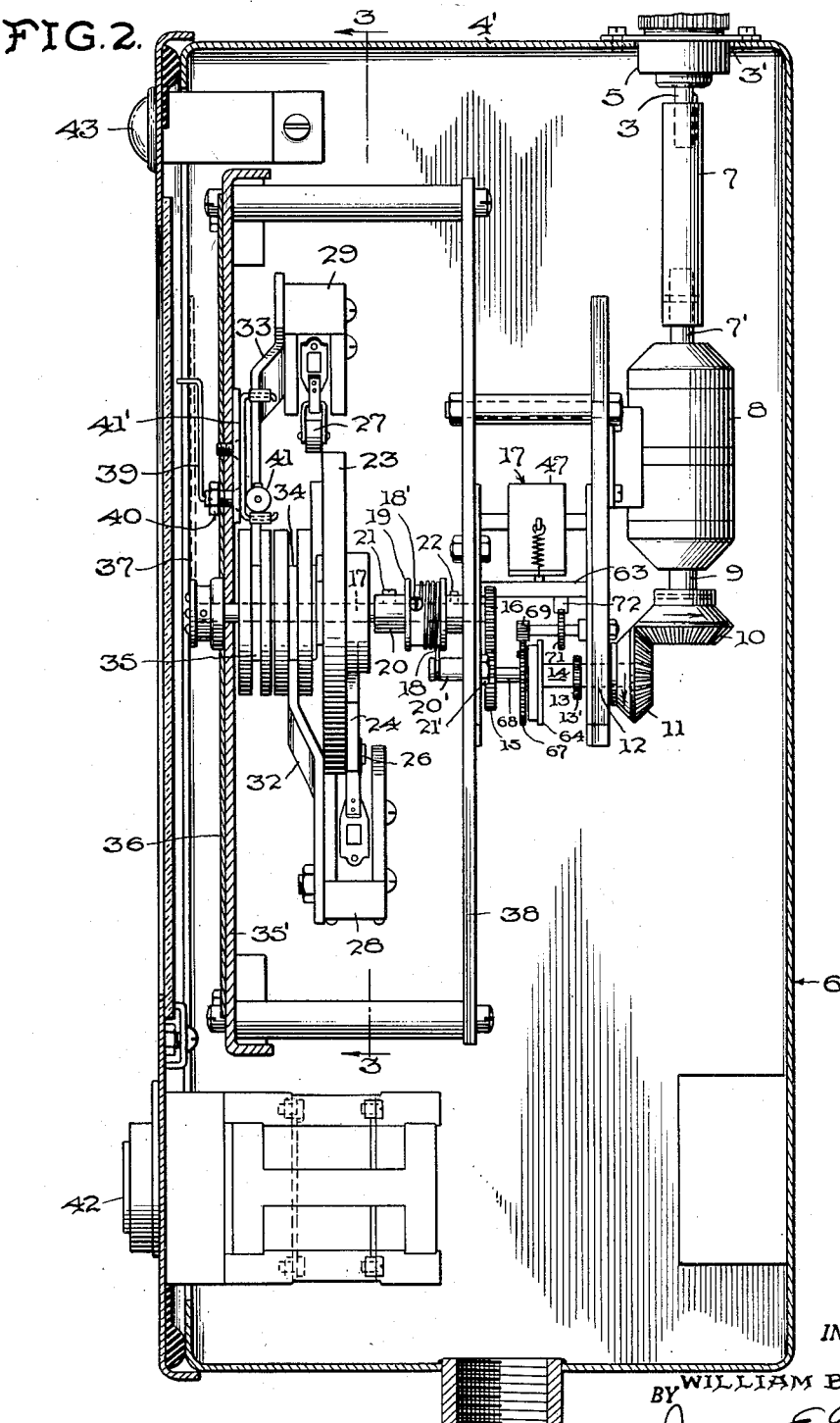
Figure 2 is a sectional view of the dispensing control mechanism of Figure 1, when taken along lines 2—2 thereof.
Figure 3:
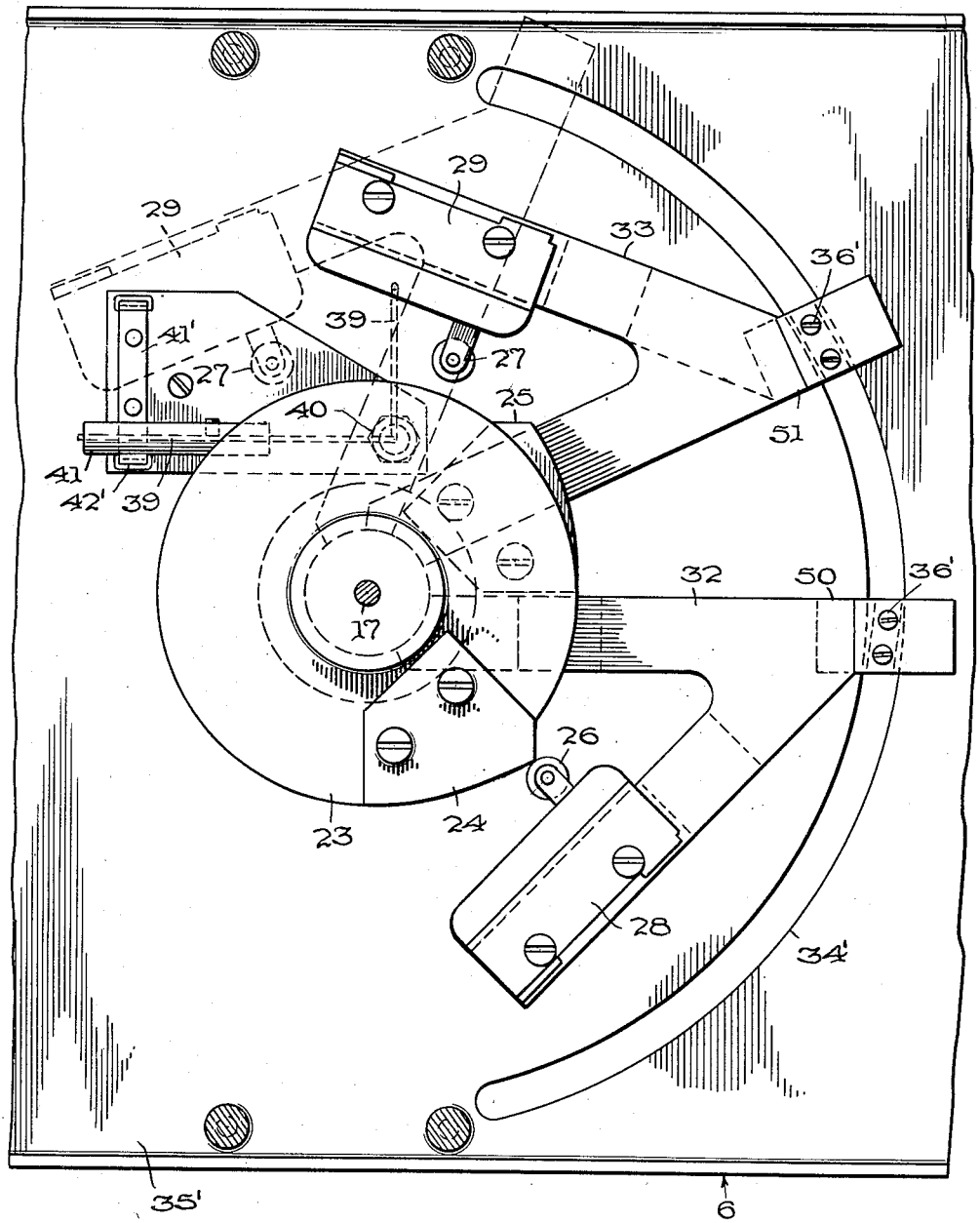
Figure 3 is another sectional view partially broken of the indicating and dispensing control mechanism showing the various elements therein, when taken along lines 3—3 of Figure 2.
Figures 4, 5:
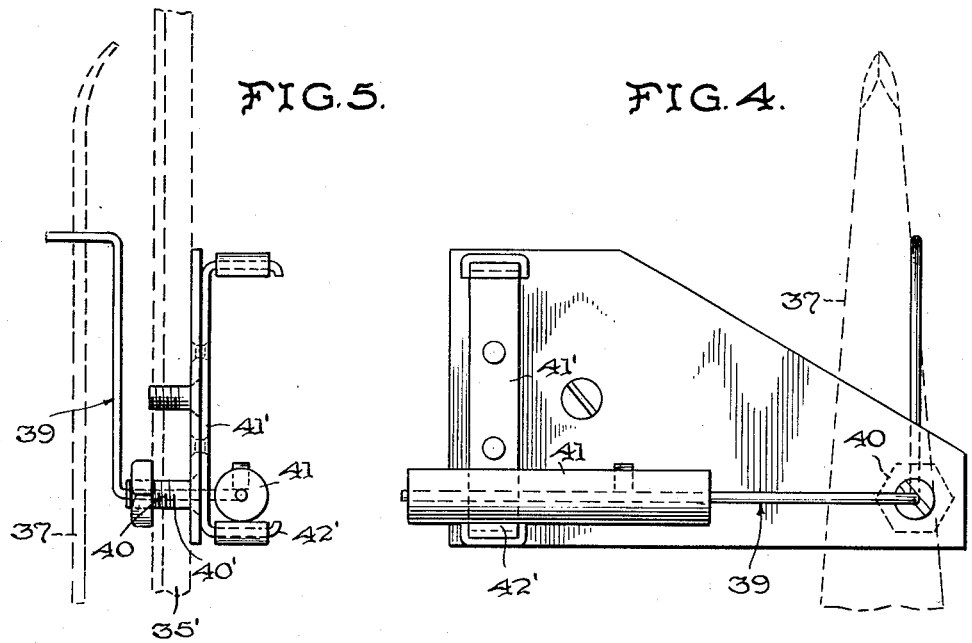
Figure 4 is an enlarged rear elevational view of the dial pointer and reset damper elements of the dispensing control mechanism.
Figure 5 is an enlarged side elevational view of the dial pointer reset damper shown in Figure 4.

By referring to the drawings and particularly Figures 1–3, it will be further observed that the dispensing control mechanism 4 of the instant invention is conveniently housed within a sheet metal box 6.

A flexible cable shaft 3 connected at one extremity to the impeller (not shown) of the fluid displacement meter 1 is passed through a suitable opening 3' in the upper wall 4' of the housing 6 by means of an adapter 5.

The end of shaft 3 which extends a short distance within housing 6 is connected by means of a coupling 7 and shaft 7' to a conventional speed ratio changer device 8, which controls the operation of a shaft 9 which projects therefrom.

Affixed to shaft 9 is a bevel gear 10, which is adapted to mesh with a second bevel gear 11 mounted on one end of shaft 12. Also mounted on the other end of shaft 12 is a gear 13, which is adapted to mesh with a similar gear 13' mounted on the shaft 14, which is located in spaced parallel relationship to shaft 12.

Figure 8:
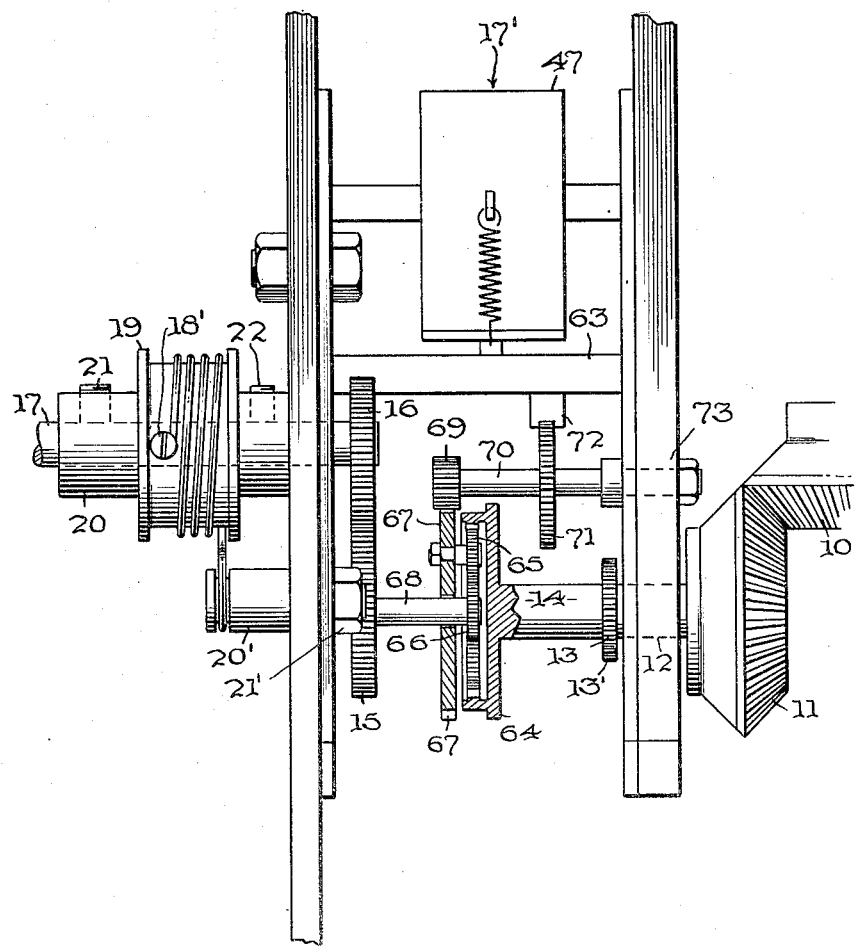
Figure 8 is an enlarged side elevational view of the dial pointer reset mechanism.

A suitable reset clutch assembly 17' is also located in housing box 6 intermediate the speed ratio changer 8 and a main shaft 17. As indicated particularly in Figure 8, this reset clutch assembly 17' is comprised of a solenoid coil 47, latch arm 63, and planetary gear train, comprised of a cylindrical housing 64 mounted on shaft 14 having bearing teeth on its inner periphery, which teeth engage gear 65 affixed to larger gear 67 which in turn engage the teeth of gear 66 disposed upon shaft 68. Gear 67 is also disposed upon shaft 68, but has a bore with a diameter of sufficient tolerance relative to the diameter of shaft 68 to permit gear 67 to turn relative to shaft 68. The teeth of gear 67 engage the teeth of pinion gear 69 disposed upon shaft 70 along with gear 71.

When the solenoid 47 is not energized the lug 72 of latch 63 is positioned between the teeth of gear 71 preventing the shaft 70 from turning, which in turn prevents gear 67 from turning by the interengagement of gears 67 and 69. When fluid meter 1 causes shaft 14 to rotate by means of the flexible cable 3 through the reduction gearing 8 and meter gears 10 and 11, this rotation is transmitted to shaft 68 through planetary gearing 64, 65 and 66. Gear 15 disposed upon shaft 68 rotates with shaft 68 and engages the teeth of gear 16 disposed upon main shaft 17 thereby causing rotation of shaft 17. When the solenoid 47 is operated to retract the latch 63 so that the lug 72 is withdrawn from beneath the teeth of gear 71, that gear along with the shaft 70 upon which it is disposed and the gear 69 is allowed to rotate freely in the bearing 73. This allows gear 67 to turn freely thereby allowing the planetary gear train to free wheel independently of shaft 14 so that the main shaft 17 may be returned to its position of rest after it has been rotated a predetermined amount initially by means of gear 11 and shaft 14. The means for accomplishing this include a helical spring 18, which is wrapped around a spool 19 attached to shaft 17 with one end of the helical spring 18 affixed to the spool by means of a screw 18' and with the other end of spring 18 being bent around a fixed rod 20'. Rod 20' is in turn rigidly affixed to framing member 38 by bolt 21'. Spool 19 may be firmly secured to sleeve 20 affixed to shaft 17 by any suitable means. Sleeve 20 has a bore of substantially the same diameter as shaft 17 with a tolerance sufficient to enable sleeve 20 to be turned relative to shaft 17. Sleeve 20 is adjustably fixed in position on shaft 17 by means of set screws 21 and 22. Tension on helical spring 18 may be adjusted by loosening set screws 21 and 22, turning the sleeve 20 relative to shaft 17 until the desired tension is achieved and then tightening the set screws 21 and 22, thereby holding sleeve 20 and spool 19 in the desired position on shaft 17.

An indicating pointer or hand 37 is also rigidly secured to shaft 17, along with a cam carrier plate 23. Two cam elements 24 and 25 are bolted directly onto plate 23. These cam elements 24 and 25 are so arranged that they can contact the rollers 26 and 27 attached to switch elements 28 and 29 of any suitable type well known in the art, and thereby depress and open the switches at predetermined times.

Switch elements 28 and 29 in turn are attached to the elbow shaped carrier arms 32 and 33 respectively, the carrier arms 32 and 33 in turn being attached to the sleeves 34 and 35 respectively. Each of the sleeves 34 and 35 are independently adjustably mounted on the main shaft 17 in such a way that the arms 32 and 33 and switches 28 and 29 in turn may be manually moved to any position around the shaft 17 independently of the turning thereof. Pointers 50 and 51 are suitably attached to the outer extremities of the switch carrier arms 32 and 33, and they are used to indicate on the indicating dial face 36 the position of each of the switches 28 and 29 with respect to the amount of fluid material to be directed to the container. These pointers 50 and 51 are connected to the carrier arms 32 and 33 by means of bolts 36', which project through and ride in the arcuate recess 34' in the plate 35' for the dial face. Bolts 36' serve the additional purpose of clamping plate 35' between pointers 50 and 51 and carrier arms 32 and 33 respectively. This action locks carrier arms 32 and 33 in place at the selected gallonage.

Accordingly, for example, when the cam element 24 moves around on shaft 17, ultimately actuated in turn by fluid meter 1 in the manner previously described, to the set position of the switch element 28, as indicated in Figure 1, it depresses the switch element 28 opening the circuit to the solenoid 31 for control valve 30, thereby closing the valve 30 after 240 gallons of pitch material have been added to the batch in the mixing container.

Switch elements 28 and 29 can thus be moved around the shaft 17 shutting the valve 30 off in any position, and for the purposes of illustration from a minimum of 180 gallons to a maximum of 300 gallons or any quantity between these limits. The employment of two switch elements 28 and 29, and properly adjusting them independently with respect to one another on shaft 17 by means of arms 32 and 33, which shaft in turn is actuated by the flexible cable 3 and fluid meter 1, makes it possible to add automatically a second batch of material at the proper time after the first batch has been added, with the second batch being of a different quantity than the first batch. For the purposes of illustration the dispensing control mechanism as shown in Figure 1 is so adjusted that the switch elements 28 and 29 operate to allow first 240 gallons of pitch material to be added to the container, then about 20 gallons more at a later time so that a total of 260 gallons of pitch material can be fed to the container. In addition to the automatic addition of pitch, provision is made for manual addition. This is accomplished by means of by-passing switches 28 and 29, to be more fully described later, and contactors 44b and 44c with momentary contact switch 42 located on the face of the sheet metal box 6. As long as switch 42 is held in contact, material will continue to flow.

Although the specific device described for the purpose of illustration employs only two switch elements, it is obvious to anyone skilled in the art that more than two may be employed to add more than two differing succeeding portions.

Figure 7:
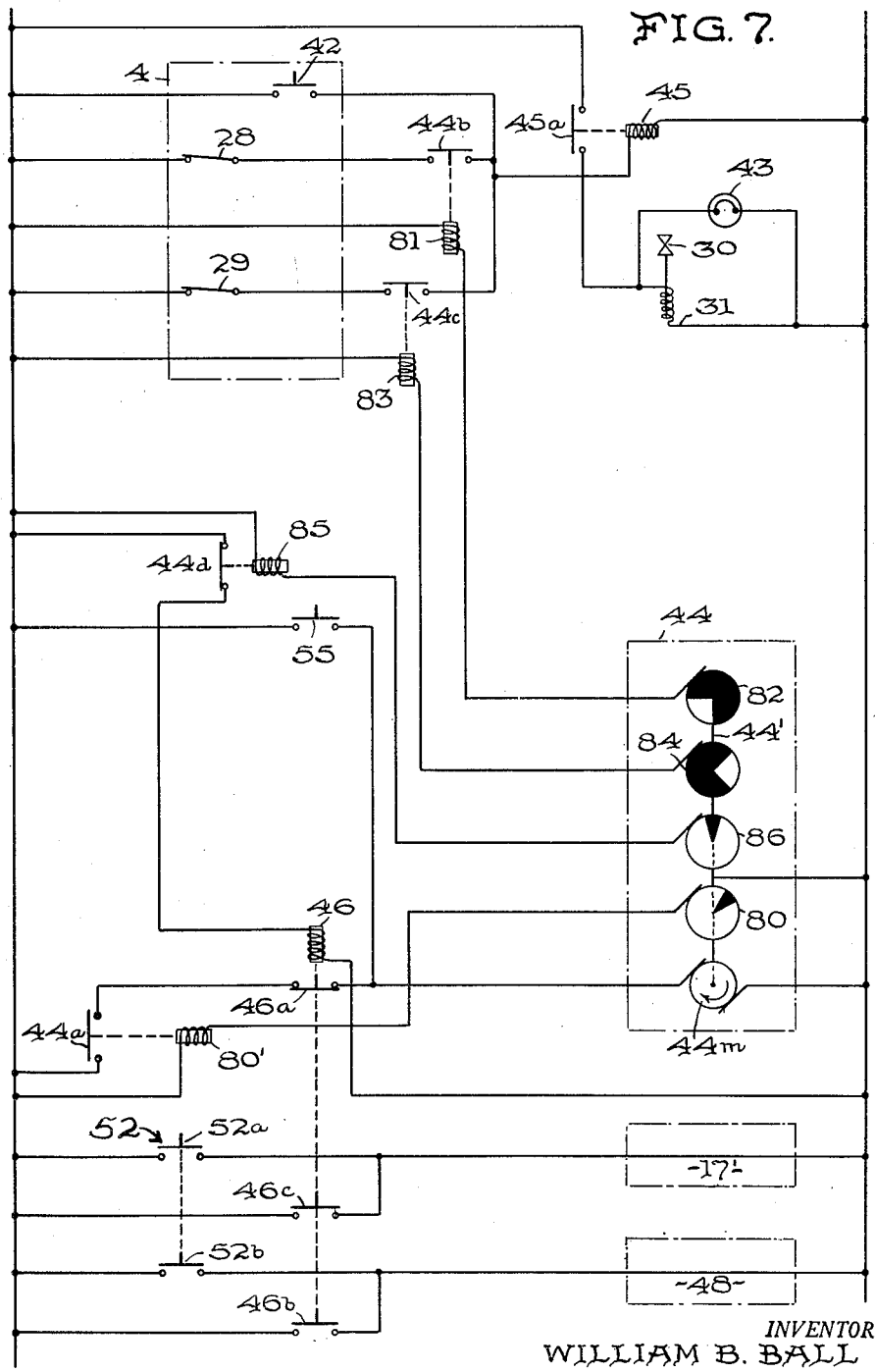
Figure 7 is a schematic diagram of one type of electrical circuit which may be employed for making the operation of the fluid solenoid operated control valve by the dispensing control mechanism automatic.

Referring now particularly to the schematic electrical diagram Figure 7, the operation of the control apparatus, including dispensing control mechanism 4, will now be described. It is to be noted that this electrical diagram is only illustrative of a suitable electrical control means which may be used for actuating the control apparatus.

To start the feeding cycle operation the momentary contact switch 55 adjacent to the batch mixing container is depressed. This momentarily completes the circuit to the motor 44m of timer 44. The timer 44, which is operatively connected to switch 44a, by means of the commutator 80 on shaft 44' driven by motor 44m and switch energizing relay 80'. Upon energization relay 80' then operates to close this normally open switch, thereby maintaining electrical connection to the motor 44m of timer 44 through switch 44a and the normally open switch 46a, which is now also closed because of the energization of a relay 46 which is energized through normally closed timer switch 44d. After a suitable time interval has elapsed the timer 44 then operates to cause the energization of relay 45 through normally closed switch element 28 by closing switch 44b. Closing of switch 44b is effected when the relay 81 is energized, relay 81 being connected to commutator 82 affixed to shaft 44' driven by timer motor 44m. When relay 45 is energized it acts to control and close normally open switch 45a, energizing the solenoid 31 controlling valve 30 in the pitch line 2, thereby opening the valve 30 and permitting pitch to flow through the meter 1 to the mixing container. While the pitch is flowing a light 43 on the remote dispensing control mechanism 4 may be lighted to indicate the operation. The rotation of the impeller in meter 1 results in rotation of the shaft 17, carrying the cam elements 24 and 25 and the indicating hand 37 in the manner previously described. Thus, when the preselected number of gallons of pitch has passed through the meter 1, for example, 240 gallons, the cam element 24 depresses normally closed switch element 28 by contacting roller 26, thereby opening switch element 28 and breaking the circuit and de-energizing relay 45. When relay 45 drops out it opens switch 45a, thereby breaking the circuit to the solenoid 31 and de-energizing the solenoid 31 for the valve 30, closing the valve 30 and stopping the flow of pitch through line 2 and the meter 1. All the while, of course, timer motor 44m continues to operate.

The timer 44 is so adjusted with respect to the dispensing control mechanism 4 that after a suitable interval of time has elapsed, the timer 44 again operates to cause the energization of relay 45 through normally closed switch element 29 by closing switch 44c. Closing of switch 44c is effected when the relay 83 is energized. Relay 83 is energized at the proper time by commutator 84 affixed to shaft 44' driven by timer motor 44m. When relay 45 is again energized it closes normally open switch 45a, thereby energizing the solenoid 31 on valve 30. Valve 30 then opens to permit pitch to flow again through conduit 2 and the meter 1. At the time the second preselected quantity of pitch has passed through the meter 1, the second cam 25, being rotated on shaft 17 and previously adjusted thereon, now comes into position to depress normally closed switch element 29 by contacting roller 27, thereby opening switch element 29 and breaking the circuit on relay 45. The switch 45a is then opened, breaking the circuit to the solenoid 31 for valve 30, thereby stopping the flow of pitch through conduit 2 to the mixing container.

After the expiration of a further interval of time, the timer 44 operates to cause de-energization of relay 46 by opening normally open switch 44d, thereby opening the normally open switch 46a and closing normally closed switches 46b and 46c. The opening of switch 44d is effected when the relay 85 is deenergized. Relay 85 is deenergized at the proper time during the rotation of commutator 86 affixed to shaft 44' driven by timer motor 44a. This in turn causes relay 46 to drop out and become de-energized for the reasons given above.

When switch 46b is closed the solenoid operated clutch 48 for timer 44 is actuated, thereby resetting timer 44. As the timer 44 resets itself the normally closed switch 44d will be closed and switches 44a, 44b and 44c will be opened. When switch 44d is closed relay 46 is energized, closing switch 46a and opening switches 46b and 46c. As switch 46b is opened the solenoid operated timer clutch 48 is de-actuated.

The solenoid 47 of the clutch assembly 17' for controlling the operation of shaft 17 in the dispensing control mechanism, with respect to the shafts 14 and 12 driven by cable 3, is energized simultaneously with the timer clutch solenoid 48 by the closing of switch 46c, thereby in effect disengaging shaft 17 from shaft 12 by the free wheeling action of the planetary gear train of the clutch assembly 17' and allowing spring 18 to return the dial pointer 37 and cam elements 24 and 25 to the zero position. The apparatus of the present invention may also be reset manually at any time during the operating cycle by pressing momentary contact switch 52. This closes contacts 52a and 52b, energizing the solenoid operated dial and cam shaft clutch assembly 17' and the solenoid operated timer clutch 48.

In an advantageous embodiment of the invention, the reset or return motion of the dial pointer 37 may be arrested by a piano wire damper or stop 39 at the zero position. Piano wire stop 39 is shaped like a crank arm and passes through bushing assembly 40 located in a suitable aperture 40' in the backing plate 35'. A weight 41 is located on the other end of said piano wire stop 39 such that a cushion against sharp impact is provided for dial indicator or pointer 37. As the pointer 37 strikes the piano wire 39, the weight 41 is lifted upward. This operation absorbs the energy to a large extent and limits the rebound of the indicating hand 37 to a small percentage of that which would result from the use of a spring stop. A channel shaped element 41' provided with a receiving lip 42' is also attached to the inside face of plate 35', lip 42' being adapted to hold weight 41 when the wire stop 39 is not in use. In the final movement, weight 41 drops to its lower position and places the hand 37 at the proper zero setting.

While the control apparatus, including the dispensing control mechanism, has been described as being adapted for use in controlling the addition of proper proportions of pitch to a petroleum paste for batch operation, its application is not limited thereto, but may be employed wherever it is necessary to control the additions of fluid material to a mixing container at predetermined periods of time, and where the portions of material are of predetermined quantities. While the form of apparatus herein described constitutes the preferred embodiment of the invention, it is to be understood that the invention is not limited thereto, and that various changes and modifications may be made therein without departing from the spirit and scope of the invention as defined in the appended claims.

What is claimed is:

1. A control apparatus for regulating the flow of fluid material through a conduit, comprising the combination of a solenoid operated valve located in said conduit, a timer for periodically opening said valve and for holding said valve open to permit the free flow of fluid therethrough, circuit means for connecting said timer to said valve solenoid, a meter element also located in said conduit for measuring the amount of fluid passing therethrough when said valve is open, a dispensing control mechanism actuated by said meter element for closing said valve when a predetermined amount of fluid has passed through said conduit, said dispensing control mechanism including a rotatable shaft, a plurality of carrier arms attached to said shaft, a separate switch element affixed to each of said carrier arms, a plurality of cam elements also attached to said shaft, each one of which is adapted to actuate a separate switch element, circuit means for connecting each of said switch elements to said valve independently of said timer, and means for operatively connecting said meter element to said shaft on said dispensing control mechanism whereby upon predetermined amounts of rotation of said shaft by said meter element when the valve in said conduit is open, said cam elements will be independently and successively operated so as to independently and successively operate each of said switch elements thereby causing said valve to close at different times after a plurality of predetermined amounts of fluid have separately passed through said conduit, and to remain closed until it is again opened by said timer.

2. A control apparatus of the type claimed in claim 1, wherein an indicating pointer is also attached to said shaft.

3. A control apparatus of the type defined in claim 1, wherein the means for connecting said meter element to said rotatable shaft include a flexible cable.

4. A control apparatus of the type defined in claim 3, including means for individually adjusting the position of each of said carrier arms on said shaft, whereby the switch elements on each of the carrier arms may be contacted by the cam elements associated therewith after different predetermined amounts of rotation of said shaft effected in turn by said meter element.

5. The combination defined in claim 1, including manually operable means for resetting said timer and said dispensing control mechanism at any time during the operating cycle of said control apparatus.

6. A control apparatus for regulating the flow of fluid material through a conduit, comprising the combination of a solenoid operated valve located in said conduit, a timer for periodically opening said valve and for holding said valve open to permit the free flow of fluid therethrough, circuit means for connecting said timer to said valve solenoid, a meter element also located in said conduit for measuring the amount of fluid passing therethrough when said valve is open, a dispensing control mechanism actuated by said meter element for closing said valve when a predetermined amount of fluid has passed through said conduit, said dispensing control mechanism including a rotatable shaft, an indicating pointer rigidly attached to said shaft, and a plurality of carrier arms attached to said shaft, a separate switch element affixed to each of said carrier arms, a plurality of cam elements also attached to said shaft, each one of which is adapted to actuate a separate switch element, circuit means for connecting each of said switch elements to said valve independently of said timer, means including a flexible cable for operatively connecting said meter element to said shaft on said dispensing control mechanism whereby upon predetermined amounts of rotation of said shaft by said meter element when the valve in said conduit is open, said cam elements will be independently and successively operated so as to independently and successively actuate each of said switch elements, thereby causing said valve to close at different times and after a plurality of predetermined amounts of fluid have separately passed through said conduit and to remain closed until it is again opened by said timer, and means including a helical spring for resetting said indicating pointer after successive predetermined amounts of fluid have been allowed to pass through the conduit and the feeding cycle is completed.

7. A control apparatus of the type defined in claim 6, including means for dampening the thrust of said indicating pointer when said indicating pointer is returned to a position of rest by said helical spring.

8. A control apparatus of the type described for regulating the flow of fluid material through a conduit comprising the combination of a solenoid operated valve located in said conduit, a timer for periodically opening said valve and for holding said valve open to permit the free flow of fluid therethrough, circuit means for connecting said timer to said valve solenoid, a meter element also located in said conduit for measuring the amount of fluid passing therethrough when said valve is open, a dispensing control mechanism located in spaced relationship to and actuated by said meter element for closing said valve when a predetermined amount of fluid has passed through said conduit, said dispensing control mechanism including a rotatable shaft, a cam element attached to said shaft, switch means actuated by said cam element, circuit means connecting said switch means to said valve, means for operatively connecting said meter element to said shaft on said dispensing control mechanism whereby upon a predetermined amount of rotation of said shaft and said cam element by said meter element, said switch means will be actuated to cause said valve to close after a predetermined amount of fluid has passed through said conduit so as to prevent further flow of fluid material through said conduit until said valve is again opened by said timer, an indicating pointer also attached to the rotatable shaft of said dispensing control mechanism, automatically operable reset means for resetting said indicating pointer after a predetermined amount of fluid has been allowed to pass through the conduit and the feeding cycle is completed, and dampening means for absorbing the thrust of said indicator pointer when said indicator pointer is returned to a position of rest by said automatically operable reset means.

9. The combination defined in claim 6, including manually operable means for resetting said timer and said dispensing control mechanism at any time during the operating cycle of said control apparatus.

References Cited in the file of this patent

UNITED STATES PATENTS

| | | |
|---|---|---|
| 1,607,899 | Long | Nov. 23, 1925 |
| 1,739,787 | Doughty et al. | Dec. 17, 1929 |
| 1,775,293 | Pfening et al. | Sept. 9, 1930 |
| 1,808,163 | Gottfreid | June 2, 1931 |
| 1,958,541 | Hutchings | Mar. 15, 1934 |
| 2,018,538 | Webb | Oct. 22, 1935 |
| 2,193,474 | Brayer | Mar. 12, 1940 |
| 2,255,677 | Penney | Sept. 9, 1941 |
| 2,507,255 | Kaufman | May 9, 1950 |